United States Patent
Hodgson et al.

(10) Patent No.: US 9,080,485 B2
(45) Date of Patent: Jul. 14, 2015

(54) DEVICE FOR PROVIDING REDUCING AGENT AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/291,136

(22) Filed: May 30, 2014

(65) Prior Publication Data

US 2014/0260212 A1   Sep. 18, 2014

Related U.S. Application Data

(63) Continuation of application No. PCT/EP2012/073636, filed on Nov. 26, 2012.

(30) Foreign Application Priority Data

Nov. 30, 2011   (DE) .......................... 10 2011 119 772

(51) Int. Cl.
    *F01N 3/00*    (2006.01)
    *F01N 3/035*   (2006.01)
    *F01N 3/20*    (2006.01)
    *F01N 3/04*    (2006.01)

(52) U.S. Cl.
    CPC ................ *F01N 3/035* (2013.01); *F01N 3/005* (2013.01); *F01N 3/04* (2013.01); *F01N 3/206* (2013.01); *F01N 2610/02* (2013.01); *F01N 2610/1406* (2013.01); *F01N 2610/1426* (2013.01); *F01N 2610/1486* (2013.01)

(58) Field of Classification Search
    CPC ........... F01N 3/206; F01N 3/04; F01N 3/005; F01N 3/035; F01N 2610/02; F01N 2610/1406; F01N 2610/1486; F01N 2610/1426
    See application file for complete search history.

(56) References Cited

U.S. PATENT DOCUMENTS

| 4,591,319 | A  | * | 5/1986 | Takahashi et al. | ............ | 417/360 |
| 4,811,905 | A  | * | 3/1989 | Ishikawa et al.  | ............ | 239/575 |
| 5,482,021 | A  | * | 1/1996 | Roche            | ............ | 123/456 |
| 6,283,731 | B1 | * | 9/2001 | Yoshioka         | ............ | 417/423.3 |

(Continued)

FOREIGN PATENT DOCUMENTS

| DE | 102005037201 A1 | 2/2007 |
| DE | 102008031052 A1 | 1/2009 |
| DE | 102009002209 A1 | 10/2010 |
| DE | 102010014314 A1 | 10/2011 |

(Continued)

*Primary Examiner* — Jesse Bogue
(74) *Attorney, Agent, or Firm* — Laurence A. Greenberg; Werner H. Stemer; Ralph E. Locher

(57) ABSTRACT

A device for providing reducing agent includes a tank, a delivery unit disposed at least partially in the tank and having a suction point through which the delivery unit can draw reducing agent out of the tank, and a filter covering the suction point. An intermediate space or chamber is formed between the delivery unit and the filter, and the filter is disposed on the delivery unit in such a way that it can perform a deflection movement away from the suction point if ice forms in the intermediate chamber. A motor vehicle having the device is also provided.

8 Claims, 3 Drawing Sheets

(56) References Cited

U.S. PATENT DOCUMENTS

| | | | |
|---|---|---|---|
| 8,680,437 B2 | 3/2014 | Starck | |
| 2003/0010706 A1* | 1/2003 | Baracchi et al. | 210/457 |
| 2008/0302092 A1* | 12/2008 | Yezerets et al. | 60/299 |
| 2009/0230136 A1* | 9/2009 | Dougnier et al. | 220/592.01 |
| 2012/0186237 A1* | 7/2012 | Bruck et al. | 60/287 |
| 2013/0025269 A1 | 1/2013 | Hodgson et al. | |

FOREIGN PATENT DOCUMENTS

| | | |
|---|---|---|
| DE | 102010030922 A1 | 1/2012 |
| FR | 2918718 A1 | 1/2009 |

* cited by examiner the device, which overcome the hereinafore-

DEVICE FOR PROVIDING REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2012/073636, filed Nov. 26, 2012, which designated the United States; this application also claims the priority, under 35 U.S.C. §119, of German Patent Application DE 10 2011 119 772.2, filed Nov. 30, 2011; the prior applications are herewith incorporated by reference in their entirety.

BACKGROUND OF THE INVENTION

Field of the Invention

The invention relates to a device having a delivery unit for supplying reducing agent from a reducing agent tank. The invention also relates to a motor vehicle having the device.

In motor vehicles in particular, exhaust-gas treatment devices for the purification of the exhaust gases of an internal combustion engine are used in which a fluid is added to the exhaust gas. An exhaust-gas purification method particularly commonly used in such exhaust-gas treatment devices is the selective catalytic reduction (SCR) method in which a reducing agent is added to the exhaust gas, with the aid of which reducing agent nitrogen oxide compounds in the exhaust gas are reduced. In that connection, a commonly used reducing agent is ammonia. Ammonia is normally not stored in motor vehicles directly but rather, for example, in the form of a reducing agent precursor solution which can be converted into ammonia in the exhaust gas and/or outside the exhaust gas. One particularly commonly used reducing agent precursor solution is urea-water solution. A urea-water solution that is particularly commonly used for exhaust-gas purification has a urea content of 32.5% and is available, for example, under the trademark AdBlue®. The expressions "reducing agent" and "reducing agent precursor" and "reducing agent precursor solution" will hereinafter be used synonymously for one another.

With regard to the storage and delivery of reducing agent in a motor vehicle, it must generally be noted that reducing agent can freeze. The reducing agent precursor solution AdBlue®, for example, freezes at temperatures of −11° C. In the automotive field, such low temperatures can arise, for example, during long standstill phases. A tank for reducing agent and a delivery unit for the reducing agent should therefore be configured in such a way that they are not damaged as a result of freezing of the reducing agent. At the same time, in particular for the automotive sector, it is important for a device for supplying reducing agent, in the form of an additional tank system, to be as inexpensive as possible.

SUMMARY OF THE INVENTION

It is accordingly an object of the invention to provide a device for providing or supplying reducing agent and a motor vehicle having the device, which overcome the hereinafore-mentioned disadvantages and solve or alleviate the highlighted technical problems of the heretofore-known devices and vehicles of this general type. It is sought, in particular, to propose a device for supplying reducing agent which is especially inexpensive and particularly resistant to freezing.

With the foregoing and other objects in view there is provided, in accordance with the invention, a device for supplying liquid reducing agent, comprising a tank, a delivery unit at least partially disposed in the tank and having an intake point through which the delivery unit can draw in reducing agent from the tank, and a filter which covers the intake point, wherein an intermediate space is formed between the delivery unit and the filter, and wherein the filter is disposed on the delivery unit in such a way that the filter can perform a deflection movement away from the intake point if ice forms in the intermediate space.

The delivery unit preferably has a separate or discrete chamber which is situated in the tank and which is substantially free from reducing agent (aside from the components and lines specifically provided therein for delivery purposes). The chamber is disposed in a tank wall or in the tank base. The chamber is preferably disposed in the tank base. The chamber may be a constituent part of the tank wall or of the tank base or may form a continuation of the tank wall or the tank base. The chamber preferably extends from the tank base into a tank interior of the tank toward a top side of the tank, but preferably not over the entire height of the tank, instead for example over at most 30% or even over at most 15% of the height of the tank proceeding from the tank base. An opening may be provided in the tank base. The delivery unit can then be inserted together with the chamber into the opening in such a way that the chamber becomes a constituent part of the tank base or forms a continuation of the tank base. The chamber may alternatively be an integrated constituent part of the tank base. The tank base may, for example, have an inwardly protruding portion which forms the chamber and which can be closed off by using a cover in order to ensure that the tank base and the cover together form a housing for the delivery unit.

The delivery unit or the chamber has at least one component which is expedient for actively delivering the reducing agent out of the tank (and optionally monitoring the delivery). The delivery unit preferably includes a pump, in particular in combination with at least one of the following components: at least one (regulable) valve, at least one sensor for determining pressure and/or temperature and/or the fill level of reducing agent in the tank, a (regulable, in particular electric) heater, and a control unit for the operation of the pump and/or of the valve and/or of the sensor and/or of the heater. It is very particularly preferable that no filter for the purification of the reducing agent during operation is provided in the chamber itself.

The delivery unit and the tank, or the tank interior of the tank, are connected to one another through the intake point in such a way that the reducing agent can flow from the tank into the delivery unit. In order to protect the interior of the delivery unit or of the chamber from contaminants in the reducing agent, the filter is situated (outside, that is to say in the tank) upstream of the intake point. The filter (spatially) separates the intake point from the rest of the interior of the tank. In this case, the filter preferably does not bear directly against the intake point, with (at least) an intermediate space or chamber instead being formed between the intake point and the filter. The intermediate space serves inter alia for enabling reducing agent to flow to the intake point from any arbitrary point of the filter. In other words, this means, in particular, that the filter covers not only the intake point itself but preferably also a surrounding region (for example a multiple of the inlet cross section of the intake line itself, in particular at least 10 times or even at least 50 times the inlet cross section of the intake line), and thus forms a correspondingly large intermediate space with the outer wall of the delivery unit or the chamber.

The filter preferably has as large an area as possible in order to ensure a low flow resistance for the reducing agent through the filter. For this reason, the intermediate space should be of a size sufficient to be able to ensure the flow or onward guidance of reducing agent from the filter or the surrounding region to the intake point. It is thus, however, also the case that reducing agent, which can freeze, is situated in the intermediate space.

A so-called freezing pressure may be generated, proceeding from the intermediate space into the tank, for example due to the reducing agent in the intermediate space freezing proceeding from the delivery unit toward the filter and toward the tank (a specific freezing direction is thus set in this case). The reducing agent in the intermediate space in the direct vicinity of the delivery unit should thus freeze first. It is thus not possible for an elevated pressure to be generated in the intermediate space as a result of the freezing process, because the increase in volume of the reducing agent into the intermediate space is discharged into the tank, or the still-liquid fraction is displaced toward the tank. Such freezing behavior may be achieved, for example, by virtue of the delivery unit, and/or the chamber in which the delivery unit is situated, forming a heat-conducting bridge into the tank. In the event of freezing, heat energy is then extracted from the reducing agent through the chamber and/or through the delivery unit, in such a way that ice forms firstly at the chamber and/or at the delivery unit, which propagates from there toward the filter and then toward the rest of the tank interior.

The filter is now positioned on the delivery unit in such a way that the filter can perform a deflection movement away from the intake point (or else at least partially away from the covered surrounding region) if ice forms in the intermediate space and the ice front then expands further in the direction of the tank. This may be achieved, for example, by virtue of the filter being capable of being freely displaced (in a spatially restricted manner and preferably reversibly during the thawing process) and/or deformed (in a spatially restricted manner and preferably reversibly during the thawing process) toward the tank proceeding from the delivery unit. It is accordingly possible, for example, for the filter to be mounted on a guide rail which permits the compensation movement. It is also possible for an expansion device to be provided in the holder of the filter, which expansion device permits a (reversible) deformation of the filter when an acting force exceeds a predefined value (higher than the normal flow resistance during operation). It is also possible, for example, for sealing elements to be provided between the filter and chamber, which sealing elements are flexible and permit a compensation movement of the filter. In particular, the filter does not have provided thereon any rigid holding structure that rigidly predefines the position and/or the shape of the filter. If reducing agent freezes in the intermediate space and expands in the process, an increase in the volume of the (frozen) reducing agent can preferably be compensated in a simple manner by using a deformation and/or by using a displacement of the filter. Depending on the construction of the tank and/or of the delivery unit in the region of the intake point and/or the freezing direction during operation, the filter can optionally also (in particular in sections) perform a compensation movement toward the delivery unit, wherein the filter at any rate does not move any closer to the intake point itself, in particular does not protrude into the intake point itself (that is to say, in particular, does not protrude into an intake duct).

In this case, a "freezing pressure" is to be understood, in particular, to mean the phenomenon whereby, during the freezing process, a residual liquid fraction of the reducing agent becomes encased, for example within a fully encompassing ice jacket or between a part of the tank wall and/or of the delivery unit and an ice front. There are thus, in any case, rigid boundaries which have the effect that a volume expansion of the residual fraction, as it freezes, cannot occur without a (massive) pressure increase in that region. Consequently, during the freezing process, a pressure peak of, for example, considerably higher than 20 bar or even higher than 50 bar may be generated in that space, which pressure peak could result in damage to components in the immediate or wider vicinity. In this case, however, that phenomenon is significantly reduced or even prevented in targeted fashion in the region of the intake point and/or of the filter.

In accordance with another advantageous feature of the device of the invention, the delivery unit has a basic shape and a recess which extends into the basic shape and in which the intake point and the filter are situated. The basic shape is preferably predefined by a housing of the chamber. A basic shape may, for example, be a cylinder or a cube or some other oval, polygonal or other regular shape. The recess extends into the basic shape proceeding from the tank interior. The recess forms a continuation of the tank interior into the basic shape. The recess thus forms, in particular, a local "anomaly" or deviation of the basic shape.

In accordance with a further advantageous feature of the device of the invention, the recess is at least free from undercuts or widens toward the tank. It is preferable for the recess to be formed so as to be free from undercuts and so as to widen. Undercuts would be regions of the recess in which the recess widens inwardly. Undercuts thus arise, for example in combination with a type of constriction of the recess, at a distance from the intake point. An undercut-free form of the recess prevents a block of frozen reducing agent, which cannot be displaced into the tank interior, from forming in the recess. In the case of the recess being formed with undercuts, a reducing agent ice block in the recess could become stuck in the recess on the undercuts. That specific situation is prevented by using an undercut-free form or shape of the recess. Additionally, the form or shape of the recess which widens in the direction away from the intake point can prevent a reducing agent ice block formed in the recess from becoming jammed, and can consequently also considerably reduce or even completely eliminate the risk of an undesirably high ice pressure close to the intake point.

In accordance with an added advantageous feature of the device of the invention, the filter is a hollow filter which has an inner side and an outer side, and the inner side of the filter is open toward the tank, whereas the outer side is disposed toward the intermediate space. Flow normally passes through a hollow filter from the outer side to the inner side. It is now proposed in this case that the hollow filter be disposed in such a way that flow passes through it from an inner side to the outer side. This is advantageous, for example, because the residues and contaminants that are collected by the hollow filter accumulate in the interior of the hollow filter rather than being deposited on the outer side and thus in a manner distributed throughout the tank. A hollow filter through which flow passes from the inside to the outside can therefore be easily exchanged, together with the residues and contaminants deposited thereon, and/or cleaned. Furthermore, forces acting on the hollow filter from the direction of the intermediate space (ice front) can be absorbed, without permanent damage, by using a (reversible) shrinking movement.

It is also particularly advantageous for a hollow filter of this type to be disposed in a recess which extends into the basic shape or the housing of the delivery unit. If the delivery unit includes a chamber which is inserted into an opening in the tank base, it is then possible for the delivery unit, together with the hollow filter and the contaminants, to be removed from the opening and serviced.

In accordance with an additional advantageous feature of the device of the invention, the hollow chamber is free from fixtures and/or ice compensation elements. Ice pressure compensation elements could, for example, be flexible wall sections or inserts, which are capable of absorbing the ice pressure by intrinsic deformation, in the intermediate space. In the present case, it is consequently provided, for example, that the housing wall that forms the intermediate space is rigid, and that the intermediate space is free from flexible inserts, sponges, etc.

Those walls of the delivery unit and/or of the tank which, together with the filter, delimit the intermediate space are preferably rigid. "Rigid" means, in particular, that no flexible regions of the wall are provided which could serve to compensate an ice pressure that arises in the intermediate space. In the case of such a configuration, it is necessary for the entire ice pressure that is generated in the intermediate space to be dissipated toward the filter and toward the tank interior. If the filter is disposed in a recess, the dissipation of the ice pressure can be achieved by using the undercut-free form of the recess and by using the compensation movement of the filter.

In accordance with yet another advantageous feature of the device of the invention, the filter is of conical form or shape. In an alternative refinement, the filter may also be formed in the manner of a cylinder (hollow filter). A filter formed in this way can be particularly advantageously disposed in a recess of the delivery unit. In order to make it possible to realize a particularly large filter surface, the filter may additionally have a corrugation extending at least partially in the circumferential direction. The conical form of the filter need not imperatively narrow to a point. It is also possible for the cone to be truncated, and to thus form a type of taper or a frustum. Furthermore, it is also possible for the cone to be rounded at the smaller side.

In accordance with yet a further advantageous feature of the device of the invention, from any arbitrary point of the intermediate space, a flow path for air bubbles out of the intermediate space into the tank exists which rises continuously from the arbitrary point to the tank. In this case, it is clear that this relates to the position of the device in the installed state (the flow path of the air bubble is ultimately co-determined by the force of gravity). This is already evident to a person skilled in the art on the basis of the connections, even before the actual assembly process, and the person skilled in the art is thus capable of verifying this functional feature even on the device on its own. The typical orientation of the device in the installed state must be taken into consideration for the assessment of the continuous rise of the flow path. In the installed state, the geodetic position of the flow path back into the tank proceeding from the arbitrary point rises continuously. It can be achieved in this way that no air bubbles collect in the intermediate space, and that instead, air bubbles always automatically rise out of the intermediate space into the tank. The intermediate space is preferably configured in such a way that, even if the device is in a slightly oblique position, the continuously rising flow path for air bubbles from any arbitrary point of the intermediate space is maintained. This preferably holds for an oblique position of up to 20° inclination with respect to the normal position. This may be achieved by using an oblique upper region of the recess. In this case, "continuously" is intended to express that the air bubbles, on the flow path, do not fall downward but at least maintain or increase their geodetic position.

It is preferably the case that the air bubbles on any flow path continuously increase their geodetic position in the upward direction, although the increase does not have to be constant. It is also clearly apparent in this case that the flow behavior of the air bubbles relates to a state in which the device is stationary (at a standstill) and there is thus (practically) no flow of the reducing agent in the tank. Furthermore, in particular, it is assumed that the flow behavior of the air bubble is realized even if a filter is located in the recess.

With the objects of the invention in view, there is concomitantly provided a motor vehicle, comprising an internal combustion engine, an exhaust-gas treatment device for the purification of the exhaust gases of the internal combustion engine, and a device according to the invention for supplying reducing agent for the exhaust-gas treatment device. The motor vehicle is, in particular, a passenger vehicle or a truck. Furthermore, in particular, the exhaust-gas treatment device includes an exhaust line system in which there is located an SCR catalytic converter, in which case the reducing agent can be metered in upstream of the SCR catalytic converter by using a dosing device and/or by using the delivery unit. This may be regulated by a control unit in a manner coordinated with the present operating situations of the motor vehicle and/or of the exhaust-gas treatment device.

The invention can be used, in particular, in the technical field mentioned in the introduction, in such a way that the explanations can also be taken into consideration for the more detailed description of the field of the invention.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a device for providing reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
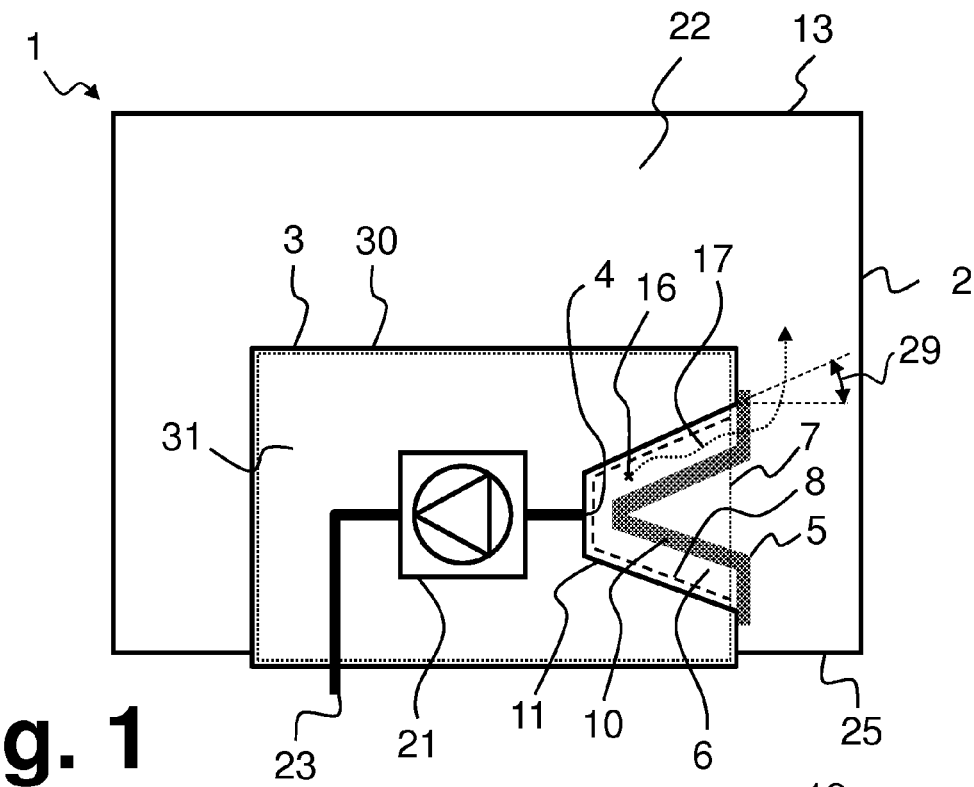
FIG. 1 is a diagrammatic, vertical-sectional view of a first embodiment of a device for supplying reducing agent.

Referring now in detail to the figures of the drawing for explaining the invention and the technical field in more detail by showing particularly preferred structural variants to which the invention is not restricted and in which proportions are diagrammatic, and first, particularly, to FIGS. 1, 2 and 3 thereof, firstly those features which correspond will be explained jointly, before differences between devices illustrated therein are discussed. The individual features illustrated in the figures may be combined with one another in any desired manner.

The figures each show a device 1 having a tank 2 and a delivery unit 3 disposed in the tank 2. The delivery unit 3 extends into a tank interior 22 proceeding from a tank base 25. The delivery unit 3 in each case includes a housing 30. A chamber 31 disposed in the housing 30 has a pump 21 for delivering reducing agent out of the tank interior 22. The delivery unit 3 in each case has a connector 23 to which a line for the delivery of the reducing agent to an exhaust-gas treatment device can be connected. The pump 21 extracts the reducing agent from the tank interior 22 at an intake point 4. The delivery unit 3 in each case has a basic shape 7 which is predefined, in particular, by the housing 30. In each of FIGS. 1, 2 and 3, the basic shape 7 is, for example, a cylinder. In each of FIGS. 1, 2 and 3, the delivery unit 3 is disposed on the tank base 25 and extends from there toward a top side 13 of the tank 2, but does not extend over the entire height of the tank.

Figure 2:
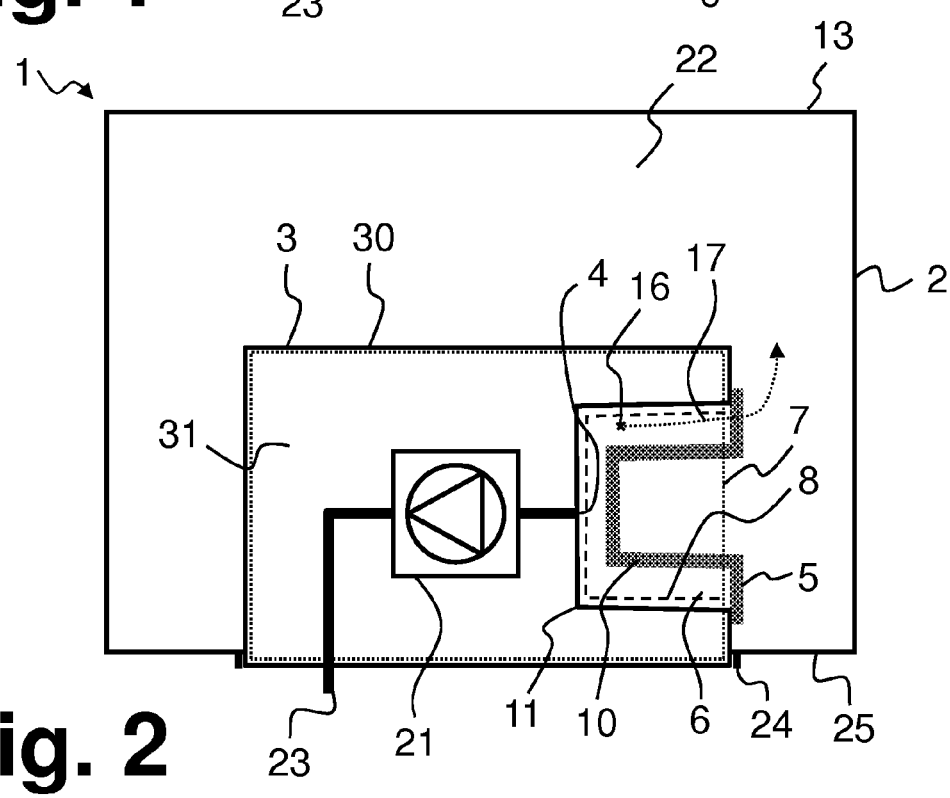
FIG. 2 is a vertical-sectional view of a second embodiment of a device for supplying reducing agent.
Figure 3:
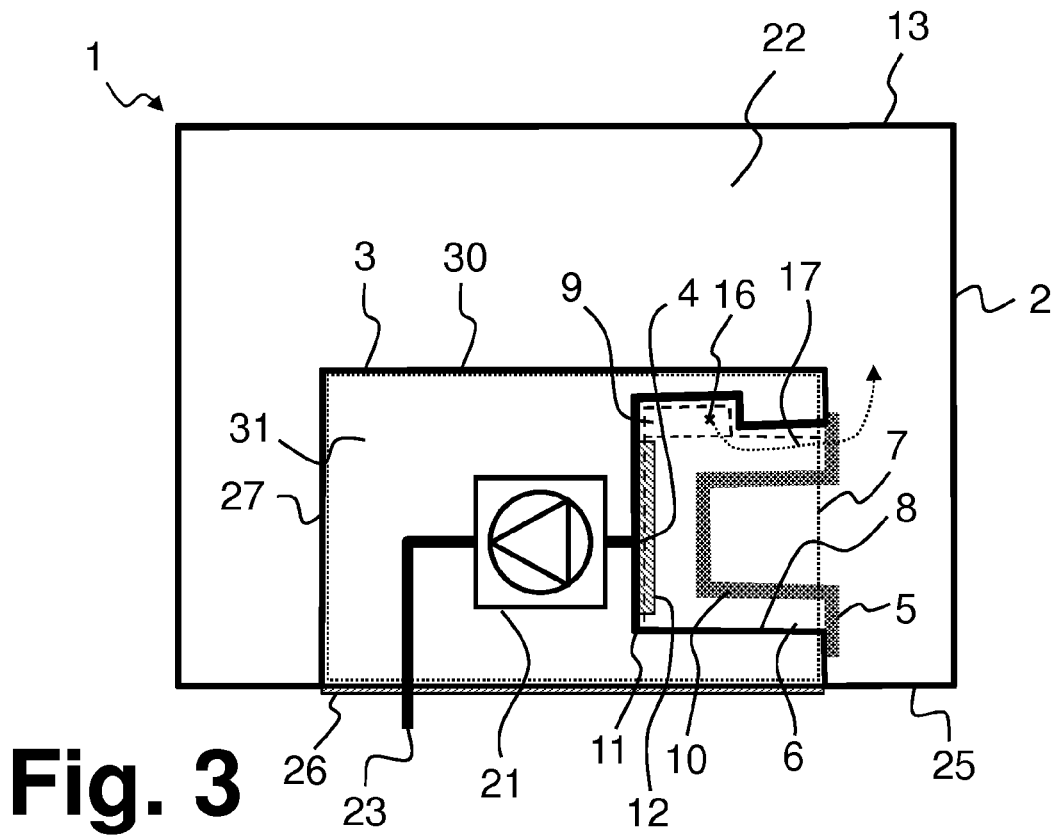
FIG. 3 is a vertical-sectional view of a third embodiment of a device for supplying reducing agent.

In FIG. 2, it is shown by way of example that the delivery unit 3 may be inserted into an opening 24 in the tank base 25. Alternatively, the delivery unit 3 or a housing of the delivery unit 3 may be an integral constituent part of or formed as one piece with the tank base 25, and the tank base 25 may continue in the region of the delivery unit 3 as the housing of the delivery unit 3, and for this purpose may form an inwardly protruding portion 27 of the tank base 25. That variant is shown by way of example in FIG. 3. In order to seal off the delivery unit 3, the inwardly protruding portion 27 may be closed off by using a cover 26. The inwardly protruding portion 27 of the tank base 25 and the cover 26 then form a housing of the delivery unit 3. A recess 8 extends into the basic shape 7 of the delivery unit 3. The intake point 4 is situated in the recess 8. The intake point 4 (and a region surrounding the latter in the recess 8) is covered by a filter 5, in such a way that an intermediate space 6 is formed between a wall section 11 of the delivery unit 3 and a filter wall 10 of the filter 5.

In each of the embodiments of the device 1 in FIGS. 1 and 2, the recess 8 is formed so as to be free from undercuts. In order to illustrate an undercut 9, FIG. 3 shows a recess 8 with an undercut 9.

It is shown in FIGS. 1 and 2 that, from any arbitrary point 16 of the intermediate space 6, there is a continuously rising flow path 17 for air bubbles out of the intermediate space 6 into the tank 2 or into the tank interior 22. An arbitrary point 16 in the intermediate space 6 is likewise indicated in FIG. 3. The arbitrary point is, however, situated in the undercut 9 of the recess 8. The flow path 17 according to FIG. 3 thus does not rise continuously, and an air bubble could become trapped in the region of the recess 8.

FIG. 1 shows by way of example that the recess 8 even has, in the upper region, an angle 29 oriented toward the top side 13 of the tank 2. The angle 29 is preferably greater than 10° and particularly preferably greater than 20°. This makes it possible to realize a situation in which, even if the device 1 or the tank 2 is in an oblique position, there is a continuously rising flow path 17 for air bubbles from any arbitrary point 16 of the intermediate space 6 out of the intermediate space 6 into the tank 2 or into the tank interior 22.

In the embodiments of the device 1 in FIGS. 1 and 2, the intermediate space 6 is furthermore free from fixtures 12 and/or inserts. Fixtures 12 may, for example, be compressible and/or in the form of a sponge and positioned in the intermediate space 6. For illustrative purposes, fixtures 12 are illustrated in FIG. 3.

The filter of a device according to the invention may be configured in various ways. FIG. 1 illustrates a filter 5 which is conical, or formed in the manner of a cone, and which extends into the recess 8. FIGS. 2 and 3 each show a cylindrical filter 5 which extends into the recess 8. It is generally preferable if the filter, when positioned in the recess, does not project beyond the recess, that is to say extends only in a region within the recess.

Figure 4:
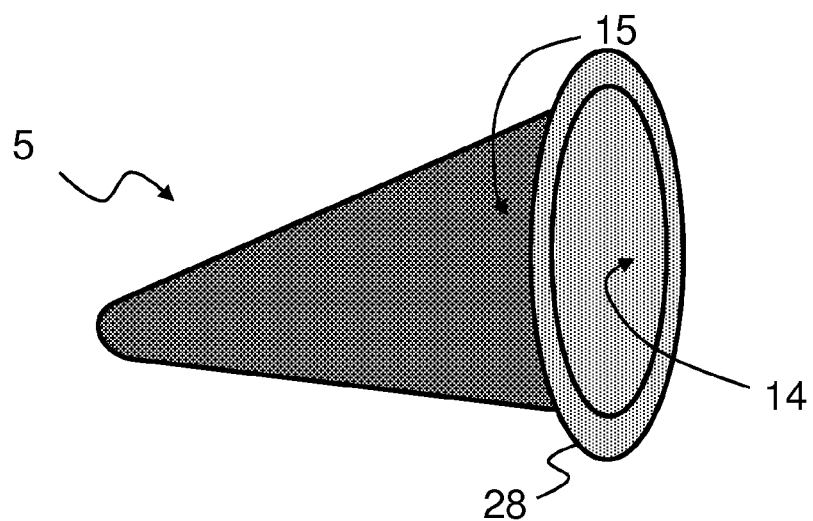
FIG. 4 is a perspective view of a filter for a device for supplying reducing agent.

For illustrative purposes, an example of a filter 5 is illustrated in detail in FIG. 4. The figure shows a conically shaped filter 5 with a rounded end, in which the filter has an inner side 14 and an outer side 15. Viewing FIGS. 1 and 4 together, it can be seen that the inner side 14 of the filter 5 extends or faces toward the tank interior 22 of the tank 2, whereas the outer side 15 of the filter 5 delimits or faces the intermediate space 6. A collar 28 of the filter 5 is also shown. Through the use of the collar 28, the filter 5 can bear against, or be mounted on, the housing of a delivery unit.

Figure 5:
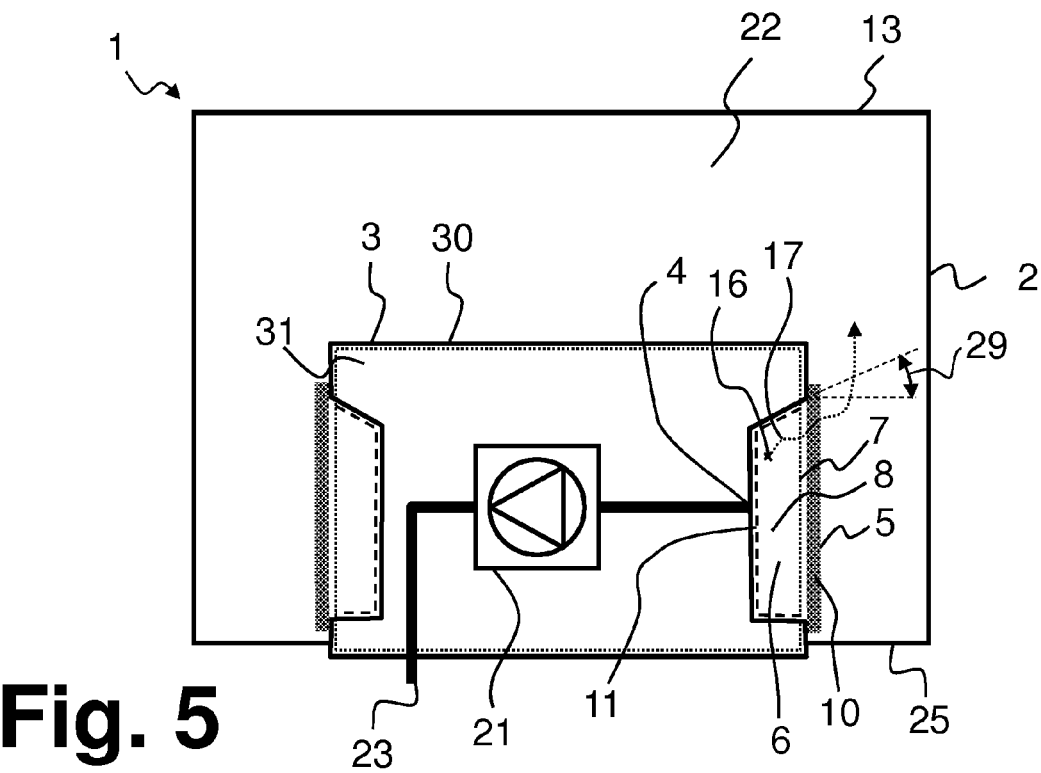
FIG. 5 is a vertical-sectional view of a fourth embodiment of a device for supplying reducing agent.

FIG. 5 shows a further embodiment of a device 1 for supplying reducing agent. This variant also has a tank 2 in which there is disposed a delivery unit 3 that extends into the tank interior 22, toward a top side 13 of the tank, proceeding from the tank base 25. The delivery unit 3 extracts reducing agent from the tank 2 through the intake point 4. The reducing agent is delivered from the intake point 4 to the connector 23 by the pump 21. A reducing agent line, which may be connected to the connector 23, leads to an exhaust-gas treatment device. In the region or vicinity of the intake point 4, the delivery unit 3 has a recess 8 which extends over the entire circumference of the delivery unit 3. The recess 8 extends, in the form of an encircling indentation, into the basic shape 7 of the delivery unit. The recess 8 is covered or spanned by a filter 5 which likewise has an encircling form. There is an intermediate space 6 between the filter or the filter wall 10 of the filter 5 and the delivery unit 3 or a wall section 11 of the delivery unit 3. The intermediate space 6 surrounds the entire recess 8. Pressure arising in the event of freezing of reducing agent in the intermediate space 6 can be dissipated into the tank 2. In particular, in the upper region, the recess 8 is inclined at an angle 29 of at least 10°, preferably at least 20°, toward the top side 13 of the tank 2. This has the result that, even if the device 1 is in an oblique position, there is a continuously rising flow path 17 for air bubbles from any arbitrary point 16 of the intermediate space 6 out of the intermediate space 6 into the tank 2 or into the tank interior 22. It is thus possible for air bubbles to pass easily out of the intermediate space 6.

Figure 6:
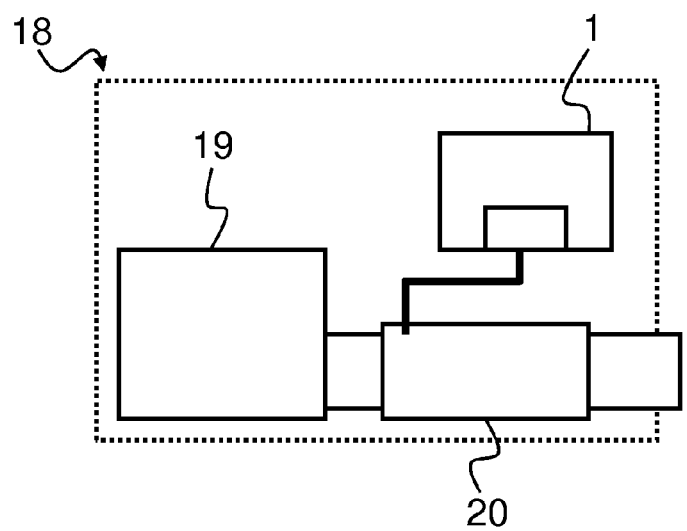
FIG. 6 is a block diagram of a motor vehicle having a device for supplying reducing agent.

FIG. 6 shows a motor vehicle 18 having an internal combustion engine 19 and an exhaust-gas treatment device 20 for purification of exhaust gases of the internal combustion engine 19. The motor vehicle 18 also has a device 1 through the use of which reducing agent for the exhaust-gas treatment device 20 can be supplied.

A device for supplying reducing agent is thus proposed herein which is particularly inexpensive and particularly resistant to freezing, and which, in particular in the application highlighted in the introduction, yields a considerable improvement for eliminating the problems discussed.

The invention claimed is:

1. A device for supplying liquid reducing agent, the device comprising:
   a tank having a top side;
   a delivery unit at least partially disposed in said tank and having a basic shape, a circumference and a recess, said delivery unit having an intake point disposed in said recess and configured to draw in reducing agent from said tank; and a filter disposed in said recess, having a top side and covering said intake point, said filter forming an intermediate space between said delivery unit and said filter, and said filter disposed on said delivery unit and configured to perform a deflection movement away from said intake point if ice forms in said intermediate space;

said recess extending into said basic shape and extending entirely over said circumference of said delivery unit, and said recess having an oblique upper region rising in a direction toward said top sides of said tank and said filter.

2. The device according to claim 1, wherein said recess is at least free from undercuts or widens toward said tank.

3. The device according to claim 1, wherein said filter is a hollow filter having an inner side and an outer side, said inner side of said filter opens toward said tank and said outer side of said filter faces toward said intermediate space.

4. The device according to claim 1, wherein said intermediate space is free from fixtures.

5. The device according to claim 1, wherein said filter has a conical shape.

6. The device according to claim 1, which further comprises a flow path for air bubbles leading out of said intermediate space into said tank, said flow path rising continuously from any arbitrary point of said intermediate space to said tank.

7. A motor vehicle, comprising:

an internal combustion engine;

an exhaust-gas treatment device configured to purify exhaust gases of said internal combustion engine; and a device according to claim 1 configured to supply reducing agent for said exhaust-gas treatment device.

8. The device according to claim 1, wherein said oblique upper region rises at an oblique angle of 20°.

* * * * *